(12) United States Patent
Delcroix et al.

(10) Patent No.: US 12,308,022 B2
(45) Date of Patent: May 20, 2025

(54) APPARATUS, METHOD, AND PROGRAM FOR UTILIZING LANGUAGE MODEL

(71) Applicant: NIPPON TELEGRAPH AND TELEPHONE CORPORATION, Tokyo (JP)

(72) Inventors: Marc Delcroix, Tokyo (JP); Atsunori Ogawa, Tokyo (JP); Tomohiro Nakatani, Tokyo (JP); Michael Hentschel, Nara (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 924 days.

(21) Appl. No.: 16/976,692

(22) PCT Filed: Feb. 18, 2019

(86) PCT No.: PCT/JP2019/005871
§ 371 (c)(1),
(2) Date: Aug. 28, 2020

(87) PCT Pub. No.: WO2019/171925
PCT Pub. Date: Sep. 12, 2019

(65) Prior Publication Data
US 2021/0049324 A1    Feb. 18, 2021

(30) Foreign Application Priority Data

Mar. 8, 2018  (JP) .................................. 2018-041781

(51) Int. Cl.
*G10L 15/18*      (2013.01)
*G06F 40/279*    (2020.01)
(Continued)

(52) U.S. Cl.
CPC .......... *G10L 15/183* (2013.01); *G06F 40/279* (2020.01); *G06N 3/045* (2023.01); *G06N 3/08* (2013.01)

(58) Field of Classification Search
CPC ....... G10L 15/18; G06F 40/279; G06N 3/045; G06N 3/08
See application file for complete search history.

(56) References Cited

U.S. PATENT DOCUMENTS 10,366,158 B2 *   7/2019   Bellegarda ............... G06N 3/02
2014/0278379 A1 *  9/2014   Coccaro ............. G10L 15/1822
                                                          704/202
(Continued)

OTHER PUBLICATIONS

Salil Deena et al., "Combining Feature and Model-Based Adaptation of RNNLMs for Multi-Genre Broadcast Speech Recognition", Interspeech, Sep. 8-12, 2016, San Francisco, USA, pp. 2343-2347.
(Continued)

*Primary Examiner* — Mark Villena (57) ABSTRACT

Disclosed is a model adaptation technology of a language model with higher adaptability. An aspect of the present disclosure relates to an apparatus includes a first neural network unit that transforms an input symbol and outputs an intermediate state; and a second neural network unit that transforms input auxiliary information and the intermediate state and predicts a symbol following the input symbol, wherein the second neural network unit includes a plurality of hidden layers receiving, as input, the intermediate state and auxiliary information, and pieces of the auxiliary information input to each hidden layer are different from each other.

20 Claims, 3 Drawing Sheets

(51) Int. Cl.
     *G06N 3/045*     (2023.01)
     *G06N 3/08*     (2023.01)
     *G10L 15/183*     (2013.01)

(56) References Cited

U.S. PATENT DOCUMENTS

| | | | |
|---|---|---|---|
| 2016/0140956 A1* | 5/2016 | Yu | G10L 15/08 |
| | | | 704/240 |
| 2016/0247061 A1* | 8/2016 | Trask | G06N 3/04 |
| 2017/0091168 A1* | 3/2017 | Bellegarda | G06N 5/022 |
| 2018/0005112 A1* | 1/2018 | Iso-Sipila | G06F 40/274 |

OTHER PUBLICATIONS

Marc Delcroix et al., "Context Adaptive Deep Neural Networks for Fast Acoustic Model Adaptation in Noisy Conditions", IEEE International Conference on Acoustics, Speech and Signal Processing (ICASSP). IEEE, 2016, pp. 5270-5274.

* cited by examiner

APPARATUS, METHOD, AND PROGRAM FOR UTILIZING LANGUAGE MODEL

CROSS-REFERENCE TO RELATED APPLICATIONS

This application is a U.S. 371 Application of International Patent Application No. PCT/JP2019/005871, filed on 18 Feb. 2019, which application claims priority to and the benefit of JP Application No. 2018-041781, filed on 8 Mar. 2018, the disclosures of which are hereby incorporated herein by reference in their entireties.

TECHNICAL FIELD

The present invention relates to a model adaptation technology of a language model.

BACKGROUND ART

A technology for adapting a model parameter of a language model to a specific topic or genre is an important issue for speech recognition or the like. It is expected that a language model adapted to a specific topic or genre may provide higher prediction accuracy of tasks such as language analysis or speech recognition than general language models.

One of the known model adaptation technologies of a language model is disclosed in NPL 1. NPL 1 discloses a model adaptation technology of a language model that is learned with a recurrent neural network (RNN). This technology adds a label of a correct genre label during a model learning to adapt a language model not depending on a genre to a model depending on a specific genre.

In addition, a model adaptation technology in an acoustic model, not in a language model, is disclosed in NPL 2.

CITATION LIST

Non-Patent Literature

[NPL 1] Salil Deena, Madina Hasan, Mortaza Doulaty, Oscar Saz, and Thomas Hain, "Combining feature and model-based adaptation of RNNLMs for multi-genre broadcast speech recognition," in INTERSPEECH, 2016, pp. 2343-2347.

[NPL 2] Marc Delcroix, Keisuke Kinoshita, Chengzhu Yu, Atsunori Ogawa, Takuya Yoshioka, and Tomohiro Nakatani, "Context adaptive deep neural networks for fast acoustic model adaptation in noisy conditions," in IEEE International Conference on Acoustics, Speech and Signal Processing (ICASSP). IEEE, 2016, pp. 5270-5274.

SUMMARY OF THE INVENTION

Technical Problem

Unfortunately, the model adaptation technology disclosed in NPL 1 uses only a genre as auxiliary information for adaptation and uses only one type of NN that uses the genre as auxiliary information, thus providing poor adaptability. In addition, it is difficult to perform appropriate learning if the correct genre label is not given.

In addition, the model adaptation technology disclosed in NPL 2 shows high adaptability in the acoustic model. Unfortunately, it is unclear how to apply the model adaptation technology to the language model and whether it is effective to apply the technology to the language model.

In view of the above problems, a purpose of the present invention is to provide a model adaptation technology of a language model with higher adaptability.

Means for Solving the Problem

To solve the above problems, an aspect of the present disclosure relates to an apparatus includes a first neural network unit that transforms an input symbol and outputs an intermediate state; and a second neural network unit that transforms input auxiliary information and the intermediate state and predicts a symbol following the input symbol, wherein the second neural network unit includes a plurality of hidden layers receiving, as input, the intermediate state and auxiliary information, and pieces of the auxiliary information input to each hidden layer are different from each other.

Effects of the Invention

The present invention can provide a model adaptation technology of a language model with higher adaptability.

DESCRIPTION OF EMBODIMENTS

The following examples disclose an estimation apparatus for estimating, from an input symbol, the next symbol using a learned neural network (language model) and a language model learning apparatus for learning the language model. Here, a "symbol" is an object to be processed by the language model, including, for example, a word, a phoneme, a morpheme, and a character. On the basis of the input symbol, the language model outputs a prediction result of a symbol that is likely to appear next. A process will be described below for an example where the processing unit is a "word."

A language model according to the examples described below receives, as input, a word vector w(t) that expresses a word in a vector having predetermined dimensions, and outputs a prediction result ^w(t+1) of the next word using auxiliary information. For example, in the speech recognition, the model is used to predict a word ^w(t+1) that is likely to be uttered next to a word w(t) uttered at time t or the like. The language model of the present invention has a primary feature that a neural network that depends on auxiliary information (such as a topic, a context, and a speaker) includes a plurality of separated hidden layers and each separated hidden layer performs transformation based on different auxiliary information ($\gamma_n$).

Example 1: Estimation Apparatus

Figure 1:
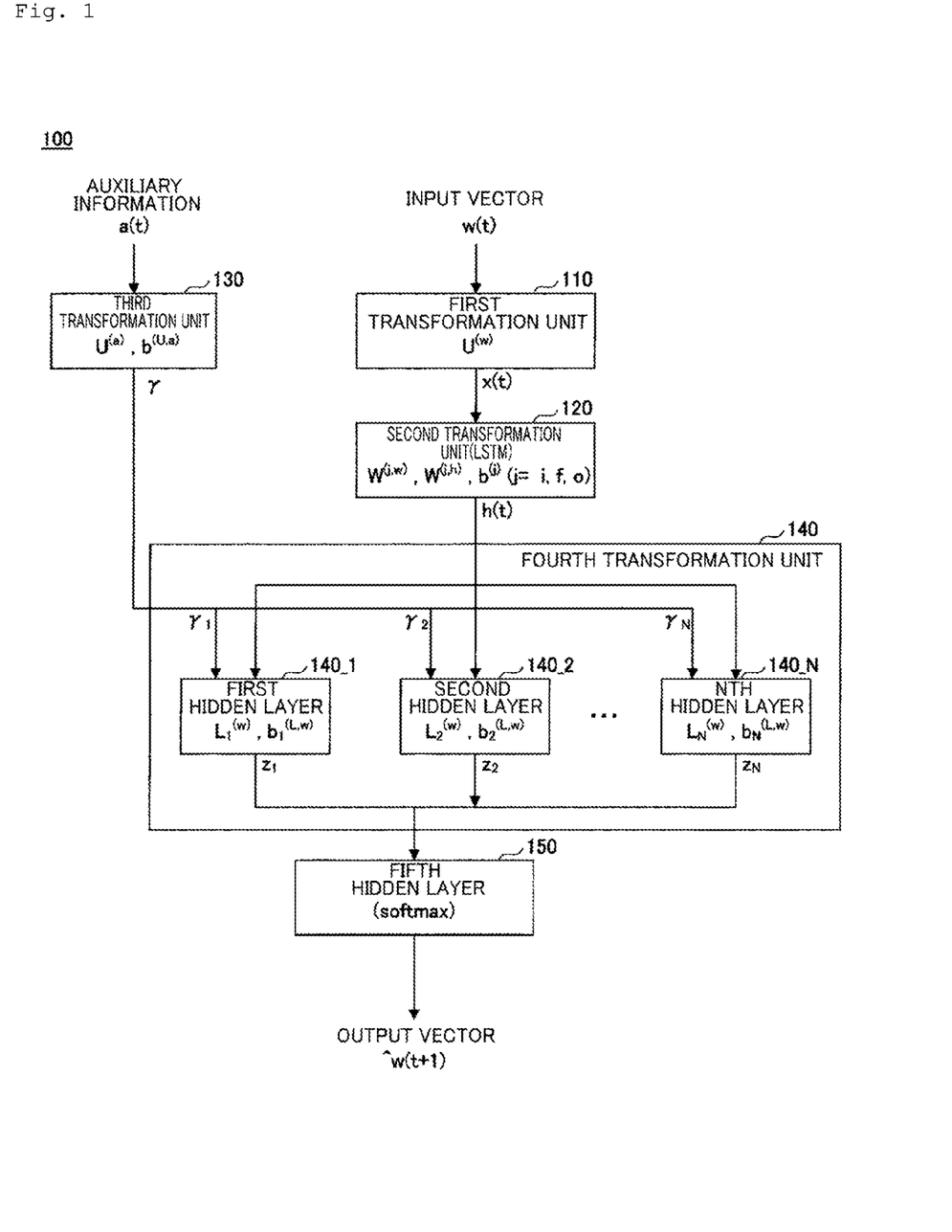
FIG. 1 is a block diagram of an estimation apparatus according to an example of the present invention.

First, with reference to FIG. 1, a description is given for an estimation apparatus using a language model according to an example of the present invention. FIG. 1 is a block diagram of an estimation apparatus according to the example of the present invention.

As shown in FIG. 1, an estimation apparatus 100 includes a first transformation unit 110, a second transformation unit 120, a third transformation unit 130, a fourth transformation unit 140, and a fifth transformation unit 150. The fourth transformation unit includes a first hidden layer 140_1, a second hidden layer 140_2, . . . , and an Nth hidden layer 140_N.

The first transformation unit 110 acquires a first output state x(t) by linearly transforming an input vector w(t) with a weight matrix $U^{(w)}$. For example, the first transformation unit 110 may be implemented by a linear layer of a neural network. Specifically, the first transformation unit 110 calculates x(t) for a vector w(t) obtained by encoding a word input at a time point t, according to $$x(t)=U^{(w)}w(t) \quad \text{[Formula 1]}$$

and outputs x(t) to the second transformation unit 120.

The second transformation unit 120 acquires a second output state h(t) by inputting x(t) output from the first transformation unit 110 to the neural network. The configuration of the neural network is not particularly limited and may include a recurrent neural network (RNN), a long short term memory (LSTM), a deep neural network (DNN), and a convolutional neural network (CNN) or the like. By way of example, when implementing the neural network with the LSTM, the second transformation unit 120 calculates the second output state h(t) according to $$i(t)=\sigma(W^{(i,w)}x(t)+W^{(i,h)}h(t-1)+b^{(i)})$$

$$f(t)=\sigma(W^{(f,w)}x(t)+W^{(f,h)}h(t-1)+b^{(f)})$$

$$o(t)=\sigma(W^{(o,w)}x(t)+W^{(o,h)}h(t-1)+b^{(o)})$$

$$g(t)=\tanh(W^{(g,w)}x(t)+W^{(g,h)}h(t-1)+b^{(g)})$$

$$c(t)=f(t)\odot c(t-1)+i(t)\odot g(t)$$

$$h(t)=o(t)\odot \tan h(c(t)) \quad \text{[Formula 2]}$$

and outputs h(t) to the fourth transformation unit 140. Here, i(t), f(t), and o(t) are an input gate, a forget gate, and an output gate in the LSTM, respectively, and $W^{(j,w)}$ and $W^{(j,h)}$ are a weight matrix of a gate j of the input word and a previous hidden layer, respectively. In addition, $\sigma(\cdot)$ denotes element-wise sigmoid of a vector, $\tanh(\cdot)$ denotes element-wise hyperbolic tangent of of a vector, and $$\odot \quad \text{[Formula 3]}$$

denotes element-wise multiplication of vectors. The element-wise sigmoid a vector is a function that returns another vector that is composed of sigmoid function values for respective elements of the vector. The element-wise hyperbolic tangent a vector is a function that returns another vector that is composed of tanh function values for respective elements of the vector. In addition, c(t) is a hidden state.

The third transformation unit 130 linearly transforms auxiliary information a(t), which is an output state of the Latent Dirichlet Allocation (LDA), with the neural network. The third transformation unit 130 thus acquires transformed auxiliary information γ and outputs it to the fourth transformation unit 140. Specifically, the third transformation unit 130 may be implemented as a linear layer for linear transformation, for a weight matrix of $U^{(a)}$ and a bias vector of $b^{(U,a)}$, according to $$\gamma=[\gamma_1,\gamma_2,\ldots \gamma_n,\ldots,\gamma_N]=\sigma(U^{(a)}a(t)+b^{(U,a)}) \quad \text{[Formula 4]}$$

The transformed auxiliary information γ is separated into each element. Each separated element $\gamma_n$ is input to a corresponding hidden layer 140_n in the fourth transformation unit 140.

Here, the Latent Dirichlet Allocation (LDA) is a sort of a topic model for estimating a latent topic (such as a subject and a field) of a text document. The LDA receives a text document as input and outputs a vector of a probability distribution representing a probability that the text document belongs to each latent topic. This output is a(t) used as input to the third transformation unit 130. In other words, the LDA is a generative model for estimating a topic in a set of text documents, each text document in the set is modeled as a combination of latent topics, and the latent topics are modeled as a combination on a topic probability. The LDA ignores the order of the words in the text document and expresses the features of the text document using a bag-of-words model. Specifically, the LDA expresses the text document as a low rank matrix that is composed of sentences in the text document expressed as vectors using the bag-of-words model. The LDA generates each text document using the following generating process.

1. The length M of a text document is sampled from the Poisson distribution.

2. A multinomial distribution for topics in the text document is selected by sampling from the Dirichlet distribution identified with α.

3. A topic is selected for each word $q_m$ of M words and a word $w_m$ is selected from the Uni-gram distribution related to the topic.

$$p(w_m|q_m,\beta) \quad \text{[Formula 5]}$$

where α and β are main parameters in the LDA and are learned in advance by model learning on the basis of training data. α determines the shape of the Dirichlet distribution on the multinomial distribution from which the topic is extracted. β is a parameter that directly affects a word probability.

The fourth transformation unit 140 includes N separated hidden layers 140_1, 140_2, . . . , and 140_N. The hidden layers are implemented by the linear hidden network (LHN). The parameter for the nth hidden layer 140_n is expressed as $L_n^{(w)}$ and the bias vector as $b_n^{(L,w)}$. Then, if among the transformed auxiliary information γ output from the third transformation unit 130, information $\gamma_n$ is input to the nth hidden layer 140_n, the nth hidden layer 140_n receives, as input, a second output state h(t) provided from the second transformation unit 120 and $\gamma_n$ provided from the third transformation unit 130 and outputs, to the fifth transformation unit 150, an output state $z_n$, which is, $$\gamma_n(L_n^{(w)}h(t)+b_n^{(L,w)}) \quad \text{[Formula 6]}$$

The fifth transformation unit 150 outputs, for an output state $z_n$ (n=1, 2, . . . , N) that is output from the fourth transformation unit 140, a softmax function value as a prediction result ^w(t+1), according to $$z = \sum_{n=1}^{N}\underbrace{\gamma_n\left(L_n^{(w)}h(t)+b_n^{(L,w)}\right)}_{=z_n} \quad \text{[Formula 7]}$$

$$\hat{\omega}(t+1) = \text{softmax}(z).$$

Here, the softmax(·) is a softmax function. It is a function that transforms an m-dimensional vector composed of real number values to an m-dimensional vector. It is also a function of transforming an input of $e=(e_1, e_2, \ldots, e_m)^T$ (T represents transpose) to an output of $\hat{e}=(\hat{e}_1, \hat{e}_2, \ldots, \hat{e}_m)^T$ as follows:

$$\hat{e}_j = \frac{\exp(e_j)}{\sum_{k=1}^{m} \exp(e_k)} \quad \text{[Formula 8]}$$

In other words, it is a function that normalizes the sum of elements in the output vector to be equivalent to 1.

Although, in the above examples, the auxiliary information a(t) is a probability distribution (vector) that represents a latent topic probability of a text document using the Latent Dirichlet Allocation (LDA), the auxiliary information a(t) is not limited thereto. For example, the auxiliary information a(t) may be any appropriate auxiliary information that affects the selection of the prediction result ^w(t+1) of the next word, which is an output of the language model, excepting the information (hereinafter referred to "input information to the separated hidden layers") generated only from the immediately preceding word w(t). For example, the auxiliary information a(t) may include the word classes of the past character strings before w(t), the context of the immediately preceding sentence (such as information relating to the utterance content of the immediately preceding speaker in a dialogue), the atmosphere of the conversation (formal or casual), the relationship with the conversation partner (such as a boss or subordinate, friends, and the first meeting person), the speaker's gender, the age, and the area of origin (that affects the language and dialect). Information such as the atmosphere of the conversation, the conversation partner, and the speaker's gender, which is sort of a word string w(t0), . . . , w(t) that is chronologically previous to the word ^w(t+1) to be predicted, may be information representing the acquisition environment of the word string. Note that in this example, t0 and t are indices of a word string, a smaller t is an index of a chronologically more previous word, and t0<t. For example, for an index t0 of a word at the beginning of a sentence, there is a word string w(t0), . . . , w(t) from the beginning of the sentence to an index (t) immediately preceding to an index t+1 of the word to be predicted.

In addition, in the above examples, the auxiliary information a(t) is one type of information, a topic probability, that is separated into the number (N) of separated hidden layers, providing either one of pieces of auxiliary information $\gamma_n$ (n=1, . . . , N) that is input to respective separated hidden layers. However, the present invention is not limited to the above configuration and may have a configuration in which a plurality of different types of auxiliary information is generated from the above various types of auxiliary information and is input to respective separated hidden layers. In short, the same type or different types of pieces of auxiliary information may be input to the separated hidden layers as long as pieces of the auxiliary information are different from each other.

As described above, each of the separated hidden layers in the fourth transformation unit in this example provides the input auxiliary information with an adaptation process corresponding to the auxiliary information and outputs the result. Then, the fifth transformation unit plays the role of totally considering all results from the separated hidden layers and outputting the prediction result ^w(t+1) of the next word that is finally output.

Example 2: Language Model Learning Apparatus

Figure 2:
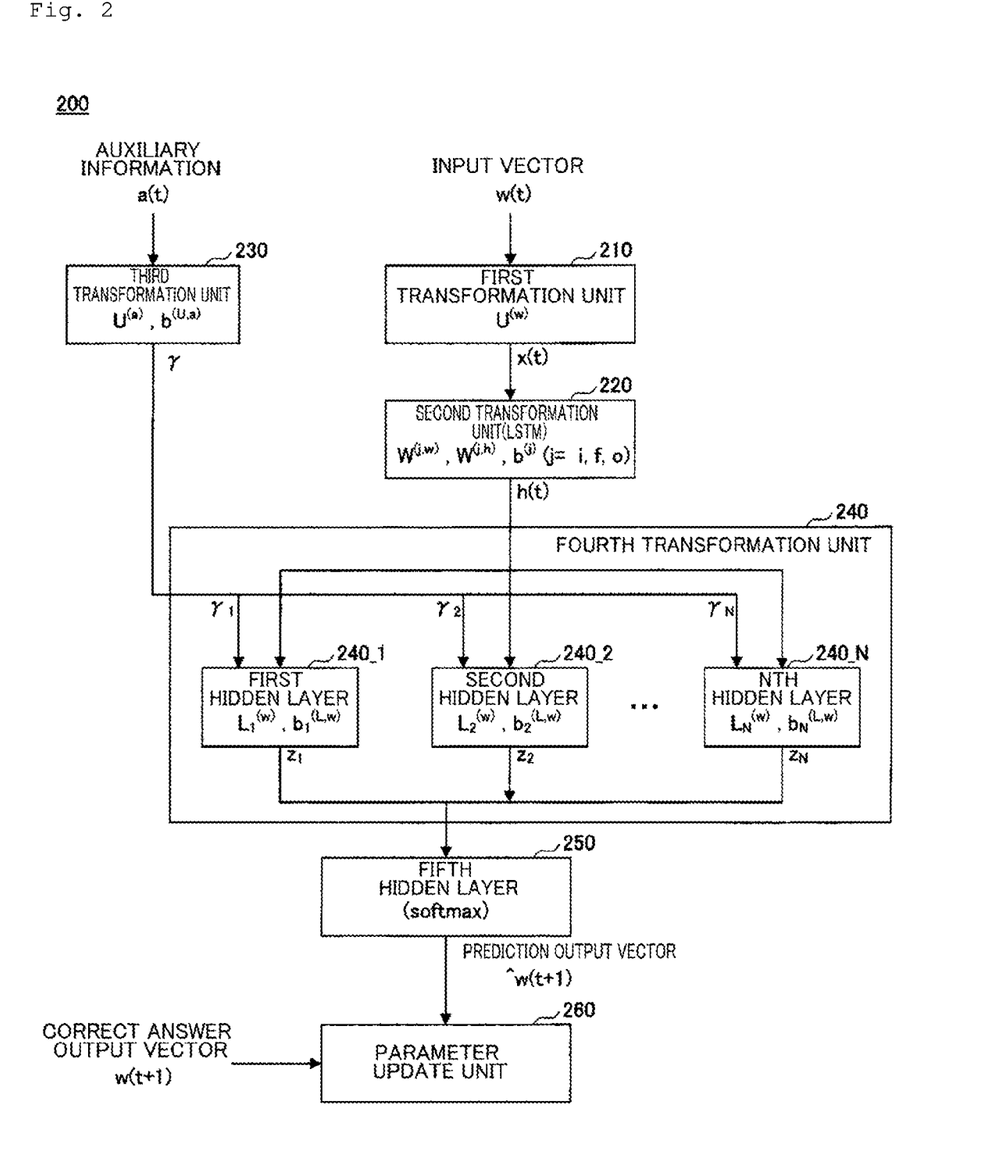
FIG. 2 is a block diagram of a language model learning apparatus according to an example of the present invention.

With reference to FIG. 2, a description is now given for a language model learning apparatus for learning the above language model according to an example of the present invention. Here, parameters learned by a language model learning apparatus 200 are the elements of the matrix and bias vector used in the first transformation unit 110, the second transformation unit 120, the third transformation unit 130, and the fourth transformation unit 140. FIG. 2 is a block diagram of a language model learning apparatus according to an example of the present invention.

As shown in FIG. 2, a language model learning apparatus 200 includes a first transformation unit 210, a second transformation unit 220, a third transformation unit 230, a fourth transformation unit 240, a fifth transformation unit 250, and a parameter update unit 260. The first transformation unit 210, the second transformation unit 220, the third transformation unit 230, the fourth transformation unit 240, and the fifth transformation unit 250 are basically the same as the first transformation unit 110, the second transformation unit 120, the third transformation unit 130, the fourth transformation unit 140, and the fifth transformation unit 150 in the estimation apparatus 100. Therefore, this example describes only their differences for ease of illustration.

An input w(t) to the first transformation unit 210 is a word vector provided for learning. It is assumed that the input w(t) is previously associated with an output vector w(t+1) of the correct answer provided to the parameter update unit 260. Like the first transformation unit 110, the first transformation unit 210 acquires a first output state x(t) by linearly transforming the input vector w(t) with a weight matrix $U^{(w)}$ and outputs x(t) to the second transformation unit 220.

Like the second transformation unit 120, the second transformation unit 220 acquires a second output state h(t) by inputting x(t) output from the first transformation unit 210 to the LSTM and outputs h(t) to the fourth transformation unit 240.

An input a(t) to the third transformation unit 230 is auxiliary information corresponding to the word vector w(t) provided for learning. The auxiliary information a(t) may be previously stored in association with w(t) as training data or may be calculated with the Latent Dirichlet Allocation (LDA) or the like from the training data w(t) that is input to the first transformation unit 210. Note that it is assumed that the type of auxiliary information used in learning and the type of auxiliary information used in operation of the estimation apparatus 100 are the same. Like the third transformation unit 130, the third transformation unit 230 acquires auxiliary information γ by linearly transforming the auxiliary information a(t) with the neural network and outputs γ to the fourth transformation unit 240.

The fourth transformation unit 240 includes N separated hidden layers 240_1, 240_2, . . . , 240_N. Like the nth hidden layer 140_n in the fourth transformation unit 140, the nth hidden layer 240_n acquires an output state $z_n$ from a second output state h(t) provided from the second transformation unit 220 and $\gamma_n$ provided from the third transformation unit 230 and outputs $z_n$ to the fifth transformation unit 250.

Like the fifth transformation unit 150, the fifth transformation unit 250 transforms an output state $z_n$ (n=1, 2, . . . , N) that is output from the fourth transformation unit 240 to generate a prediction output vector ^w(t+1) and outputs it to the parameter update unit 260. The prediction output vector ^w(t+1) may be a softmax function value related to the output state $z_n$, for example. Note that here to distinguish from a correct answer data w(t+1) corresponding to w(t) included in the training data, the output prediction output vector is represented by the symbol ^w(t+1).

The parameter update unit 260 compares the prediction output vector ^w(t+1) that is output from the fifth transformation unit 250 and the correct answer output vector w(t+1) that is previously provided as training data and updates parameters of the language model depending on the comparison result. The parameters may be updated according to, for example, any appropriate parameter update technique in the neural network such as the error propagation. Thus, the parameters of the neural network are repeatedly updated so that the prediction output vector ^w(t+1) approaches the correct answer output vector w(t+1).

Then, if the comparison result between the prediction output vector ^w(t+1) and the correct answer output vector w(t+1) reaches a predetermined criterion, the parameter update unit 260 outputs the parameter values of the neural network, and ends the parameter update process. The predetermined criterion is, for example, that the proximity (such as the distance) between ^w(t+1) and w(t+1) becomes less than a predetermined threshold, or the repeat number (the number of update processes by the parameter update unit 260) reaches a predetermined number of times or the like.

Note that if the learned language model is used in the speech recognition, the input vector w(t) may be a word vector that corresponds to a word string obtained by recognizing an input voice signal s(t) in a time interval t. The word vector may be input to the language model to obtain the word candidate ^w(t+1) that is likely to be uttered next. As a result, when obtaining a word string that is the speech recognition result of a voice signal s(t+1) in the next time interval, the estimation apparatus 100 may obtain the recognition result with reference to ^w(t+1) predicted by the language model.

Figure 3:
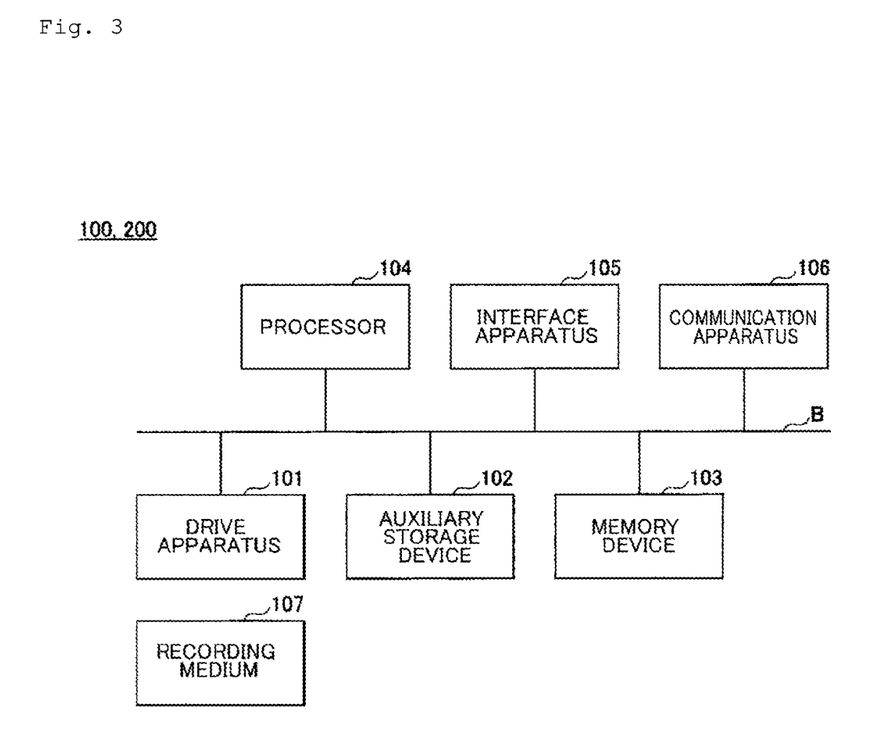
FIG. 3 is a block diagram of a hardware configuration of an estimation apparatus and a language model learning apparatus according to an example of the present invention.

Here, the estimation apparatus 100 and language model learning apparatus 200 may be typically provided by a calculation apparatus such as a server. They may include, for example, as shown in FIG. 3, a drive apparatus 101, an auxiliary storage device 102, a memory device 103, a processor 104, an interface apparatus 105, and a communication apparatus 106, which are interconnected via a bus B. Various types of computer programs including a program that implements the following various types of functions and processes in the estimation apparatus 100 and the language model learning apparatus 200 may be provided by a recording medium 107 such as a compact disk-read only memory (CD-ROM), a digital versatile disk (DVD), and a flash memory. When the recording medium 107 that stores a program is set in the drive apparatus 101, the program is installed from the recording medium 107 via the drive apparatus 101 to the auxiliary storage device 102. Note that the program may not necessarily be installed using the recording medium 107 and may be downloaded from any external device via a network or the like. The auxiliary storage device 102 stores the installed program and a necessary file and data or the like. The memory device 103 reads and stores a program and data from the auxiliary storage device 102 when the activation of the program is indicated. According to the program and various types of data such as parameters necessary to perform the program, which are all stored in the memory device 103, the processor 104 performs the various types of functions and processes of the estimation apparatus 100 and the language model learning apparatus 200 described above. The interface apparatus 105 is used as a communication interface to connect to a network or an external device. The communication apparatus 106 performs various types of communication processes to communicate with a network such as the Internet.

The estimation apparatus 100 and the language model learning apparatus 200 are not limited to the above hardware configuration and may be implemented by any other appropriate hardware configuration.

Thus, while the examples of the present invention have been described in detail, the present invention is not limited to the above specific embodiments and various modifications and variations may be made within the gist and scope of the present invention described in the claims.

REFERENCE SIGNS LIST

100 Estimation apparatus
200 Language model learning apparatus
110, 210 First transformation unit
120, 220 Second transformation unit
130, 230 Third transformation unit
140, 240 Fourth transformation unit
150, 250 Fifth transformation unit
260 Parameter update unit

The invention claimed is:

1. A computer-implemented method for predicting an object of a language based on adapting aspects of a language model, the method comprising:
    receiving an input symbol of a plurality of input symbols of the language in series;
    receiving a set of auxiliary data, wherein the set of auxiliary data is distinct from the input symbol, and the set of auxiliary data represents a latent topic of the plurality of input symbols of the language according to a bag-of-words model;
    generating, based on the received input symbol, an intermediate state symbol using a first neural network;
    generating, based on the generated intermediate state symbol and the received set of auxiliary data, an output symbol following the input symbol as a result of predicting the object using a second neural network, thereby adapting the output symbol to the latent topic of the plurality of input symbols of the language according to the bag-of-words model, wherein the second neural network comprises a plurality of hidden layers, and each hidden layer of the plurality of hidden layers receives at least a part of the generated intermediate state symbol and a distinct auxiliary data of the set of auxiliary data as input.

2. The computer-implemented method of claim 1,
    wherein the input symbol being an input symbol for learning,
    wherein the set of auxiliary data being a set of auxiliary data for learning,
    wherein the intermediate state symbol being an intermediate state symbol for learning,
    wherein the first neural network and the second neural network are distinct; and
    the method further comprising:
        receiving a correct symbol for output, wherein the correct symbol for output relates to the input symbol;
        comparing the correct symbol and the symbol following the input symbol for training; and
        updating, based on the comparison, one or more parameters in the first neural network and the second neural network for learning.

3. The computer-implemented method of claim 1, wherein the set of auxiliary data is based at least on data excluding the input symbol that influences selecting of the symbol following the input symbol.

4. The computer-implemented method of claim 1, wherein the set of auxiliary data includes at least one of:
- a topic based on a series of symbols chronologically preceding and including the input symbol,
- a context of the series of symbols, or
- an environment of acquiring the series of symbols.

5. The computer-implemented method of claim 1, wherein a symbol comprises a vector representing an object for processing by a neural network as a language model, and wherein the object includes one of:
- a word,
- a phoneme,
- a morpheme, or
- a character.

6. The computer-implemented method of claim 1, wherein each hidden layer comprises a linear hidden network based on auxiliary data that is distinct from other hidden layers in the plurality of hidden layers.

7. The computer-implemented method of claim 1, the method further comprising:
- generating, based on the generated symbol following the input symbol as the prediction, a set of prediction output vectors using softmax;
- determining an output object based on the generated set of prediction output vectors; and
- providing the output object.

8. A system for predicting an object of a language based on adapting aspects of a language model, the system comprises:
- a processor, and
- a memory storing computer-executable instructions that when executed by the processor cause the system to:
  - receive an input symbol of a plurality of input symbols of the language in series;
  - receive a set of auxiliary data, wherein the auxiliary data is distinct from the input symbol, and the set of auxiliary data represents a latent topic of the plurality of input symbols of the language according to a bag-of-words model;
  - generate, based on the received input symbol, an intermediate state symbol using a first neural network;
  - generate, based on the generated intermediate state symbol and the received set of auxiliary data, an output symbol following the input symbol as a result of predicting the object using a second neural network, thereby adapting the output symbol to the latent topic of the plurality of input symbols of the language according to the bag-of-words model, wherein the second neural network comprises a plurality of hidden layers, and each hidden layer of the plurality of hidden layers receives at least a part of the generated intermediate state symbol and a distinct auxiliary data of the set of auxiliary data as input.

9. The system of claim 8,
- wherein the input symbol being an input symbol for learning,
- wherein the set of auxiliary data being a set of auxiliary data for learning,
- wherein the intermediate state symbol being an intermediate state symbol for learning,
- wherein the first neural network and the second neural network are distinct; and
- the method further comprising:
  - receiving a correct symbol for output, wherein the correct symbol for output relates to the input symbol;
  - comparing the correct symbol and the symbol following the input symbol for training; and
  - updating, based on the comparison, one or more parameters in the first neural network and the second neural network for learning.

10. The system of claim 8, wherein the set of auxiliary data is based at least on data excluding the input symbol that influences selecting of the symbol following the input symbol.

11. The system of claim 8, wherein the set of auxiliary data includes at least one of:
- a topic based on a series of symbols chronologically preceding and including the input symbol,
- a context of the series of symbols, or
- an environment of acquiring the series of symbols.

12. The system of claim 8, wherein a symbol comprises a vector representing an object for processing by a neural network as a language model, and wherein the object includes one of:
- a word,
- a phoneme,
- a morpheme, or
- a character.

13. The system of claim 8, wherein each hidden layer comprises a linear hidden network based on auxiliary data that is distinct from other hidden layers in the plurality of hidden layers.

14. The system of claim 8, the computer-executable instructions when executed further causing the system to:
- generate, based on the generated symbol following the input symbol as the prediction, a set of prediction output vectors;
- determine an output object based on the generated set of prediction output vectors; and
- provide the output object.

15. A computer-readable non-transitory recording medium storing computer-executable instructions that when executed by a processor cause a computer system to:
- receiving an input symbol of a plurality of input symbols of the language in series;
- receiving a set of auxiliary data, wherein the auxiliary data is distinct from the input symbol, and the set of auxiliary data represents a latent topic of the plurality of input symbols of the language according to a bag-of-words model;
- generating, based on the received input symbol, an intermediate state symbol using a first neural network;
- generating, based on the generated intermediate state symbol and the received set of auxiliary data, a symbol following the input symbol as a result of predicting an object using a second neural network, thereby adapting the output symbol to the latent topic of the plurality of input symbols of the language according to the bag-of-words model, wherein the second neural network comprises a plurality of hidden layers, and each hidden layer of the plurality of hidden layers receives at least a part of the generated intermediate state symbol and a distinct auxiliary data of the set of auxiliary data as input.

16. The computer-readable non-transitory recording medium of claim 15,
- wherein the input symbol being an input symbol for learning,
- wherein the set of auxiliary data being a set of auxiliary data for learning,
- wherein the intermediate state symbol being an intermediate state symbol for learning, wherein the first neural network and the second neural network are distinct; and the method further comprising:

receiving a correct symbol for output, wherein the correct symbol for output relates to the input symbol;

comparing the correct symbol and the symbol following the input symbol for training; and updating, based on the comparison, one or more parameters in the first neural network and the second neural network for learning.

17. The computer-readable non-transitory recording medium of claim 15, wherein the set of auxiliary data is based at least on data excluding the input symbol that influences selecting of the symbol following the input symbol.

18. The computer-readable non-transitory recording medium of claim 15, wherein the set of auxiliary data includes at least one of:

a topic based on a series of symbols chronologically preceding and including the input symbol, a context of the series of symbols, or an environment of acquiring the series of symbols.

19. The computer-readable non-transitory recording medium of claim 15, wherein a symbol comprises a vector representing an object for processing by a neural network as a language model, and wherein the object includes one of:

a word, a phoneme, a morpheme, or a character.

20. The computer-readable non-transitory recording medium of claim 15, the computer-executable instructions when executed further causing the system to:

generate, based on the generated symbol following the input symbol as the prediction, a set of prediction output vectors;

determine an output object based on the generated set of prediction output vectors; and provide the output object.

* * * * *